(12) United States Patent
Chen

(10) Patent No.: US 7,303,199 B2
(45) Date of Patent: Dec. 4, 2007

(54) SWINGING DEVICE FOR A WHEEL SET

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 350 days.

(21) Appl. No.: 11/199,198

(22) Filed: Aug. 9, 2005

(65) Prior Publication Data
US 2007/0035099 A1 Feb. 15, 2007

(51) Int. Cl.
B62M 1/00 (2006.01)
B62K 19/18 (2006.01)
(52) U.S. Cl. ............................ 280/87.041; 280/87.042; 280/11.28; 280/11.27; 280/87.05; 280/282; 280/275; 280/283; 280/124.103
(58) Field of Classification Search ........... 280/87.041, 280/87.042, 11.28, 11.27, 282, 275, 283, 280/124.103, 87.05
See application file for complete search history.

(56) References Cited

U.S. PATENT DOCUMENTS

| | | | |
|---|---|---|---|
| 6,520,517 B1* | 2/2003 | Chung et al. .......... | 280/87.042 |
| 6,793,224 B2* | 9/2004 | Stratton ................. | 280/87.042 |
| 7,198,280 B2* | 4/2007 | Hara ..................... | 280/87.042 |
| 7,219,907 B2* | 5/2007 | Chang ................... | 280/87.042 |
| 2007/0200305 A1* | 8/2007 | Hanson .................. | 280/11.28 |

* cited by examiner

Primary Examiner—Lesley D. Morris
Assistant Examiner—Marlon Arce-Diaz
(74) Attorney, Agent, or Firm—Rosenberg, Klein & Lee

(57) ABSTRACT

A swinging device for a wheel set includes a center tube, an axle pipe and a restrictor. The center tube has round plates at the rear section. The round plates comprise lugs thereon. The axle pipe has a curved receiving base with a pair of fins extending from respective sides of the receiving base. The fins comprise through holes for insertion of bolts. The restrictor is pivotally connected to the rear section of the center tube and comprises ditches corresponding in position to the round plates of the center tube, so that the lugs of the round plates may be placed therein and slide along the ditches. The restrictor further comprises through holes corresponding in position to the through holes of the receiving base and the bolts. An elastic piece made of plastic material is placed between the rear section of the center tube and the axle pipe.

2 Claims, 9 Drawing Sheets

A-A

SWINGING DEVICE FOR A WHEEL SET

BACKGROUND OF THE INVENTION

1. Field of the Invention

This invention relates to a swinging device for a wheel set applied to a kick scooter or a children's tricycle, which is free to turn at a certain angle without the risk of turning over.

2. Description of the Related Prior Art

Whether two wheels are used in the front or in the rear on certain kick scooters or children's tricycles, a single-wheel turning mechanism is adopted. In case of a wild turning, either of the front or rear wheels, i.e., the outside one, can easily leave the ground to cause the scooter to turn over. Therefore, it is necessary to limit the turning angle to stay within a safe range.

SUMMARY OF THE INVENTION

The primary purpose of the present invention is to provide a swinging device for a wheel set, which is free to turn at a certain angle, free of risk of turning over due to wild swing. To achieve the purpose, the present invention includes a center tube, an axle pipe, a receiving base and an elastic piece;
  said center tube comprising a pair of round plates at a rear section, said round plates having lugs;
  said axle pipe comprising a receiving base, said receiving base comprising a pair of slots corresponding in position to said round plates of said center tube and a pair of fins at respective sides, said fins comprising through holes thereon for insertion of bolts;
  said restrictor being pivotally connected to the rear section of said center tube and comprising ditches corresponding to said round plates of said center tube for insertion of said lugs of said round plates, said restrictor comprising through holes corresponding in position to said through holes of said receiving base and said bolts for securing purpose;
  said elastic piece being placed between the rear section of said center tube and said receiving base of said axle pipe;
  said receiving base of said axle pipe being a curved shape.

The present invention has the following advantages:
1. It is free to turn at a certain angle.
2. It is free of risk of turning over due to wild swing.
3. The swinging device is located within the restrictor so that the rider will not be pinched.
4. It is compact in construction and at low production cost.

DETAILED DESCRIPTION OF THE PREFERRED EMBODIMENTS

Figure 1:
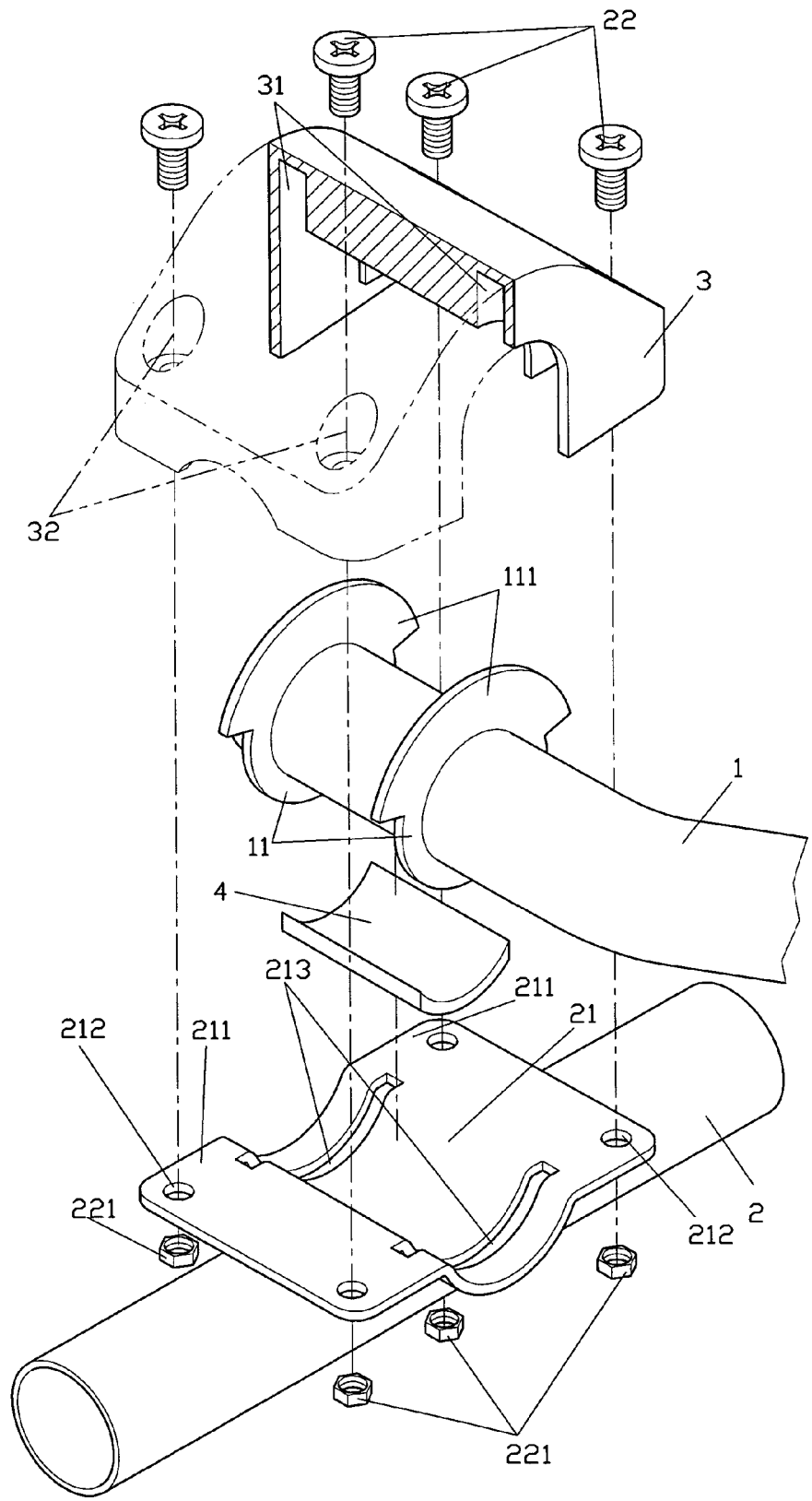
FIG. 1 is an exploded view of the present invention.
Figure 2:
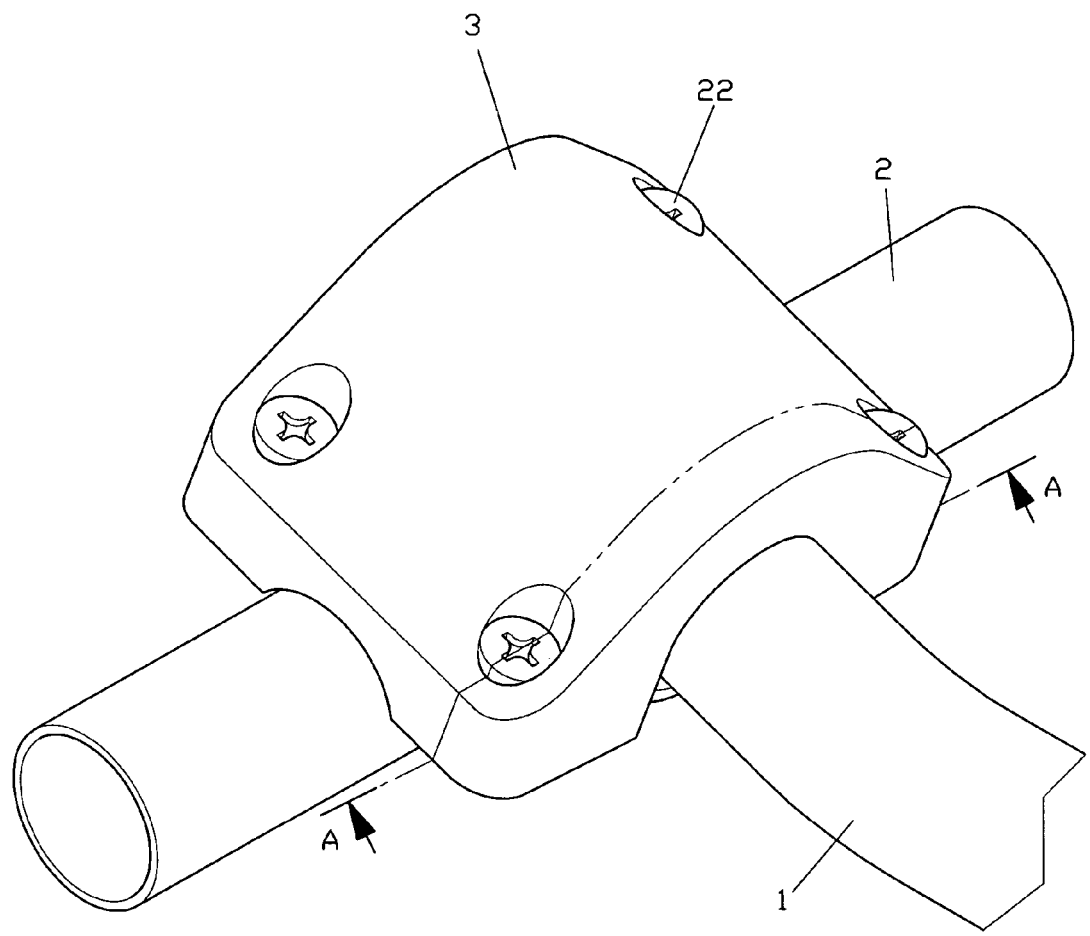
FIG. 2 is a perspective view of the present invention.

As shown in FIGS. 1 and 2, the present invention comprises a center tube 1, an axle pipe 2, a restrictor 3, and an elastic piece 4.

The center tube 1 comprises two spaced round plates 11 at a rear section. Each round plate 11 has a lug 111 thereon.

The axle pipe 2 is pivotally connected to an axle. A curved receiving base 21 is provided on the axle pipe 2. The receiving base 21 comprises a pair of slots 213 corresponding in position to the round plates 11 and a pair of fins 211 at respective sides. Each fin 211 has through holes 212 thereon for bolts 22 to insert there through from one side, and the bolts 22 are secured with nuts 221 at the other side.

The restrictor 3 is secured to the receiving base 21 of the axle pipe 2, and comprises a pair of ditches 31 corresponding in position to the lugs 111 of the center tube 1, so that the lugs 111 are inserted into the ditches 31 and confined by the ditches 31. The restrictor 3 further comprises through holes 32 corresponding in position to the through holes 212 and the bolts 22 so that the bolts 22 are inserted through the through holes 32 of the restrictor 3 and the through holes 212 of the receiving base 21 and secured with the nuts 221 thereat.

The elastic piece 4 is placed between the rear section of the center tube 1 and the receiving base 21 of the axle pipe 2.

Figure 3:
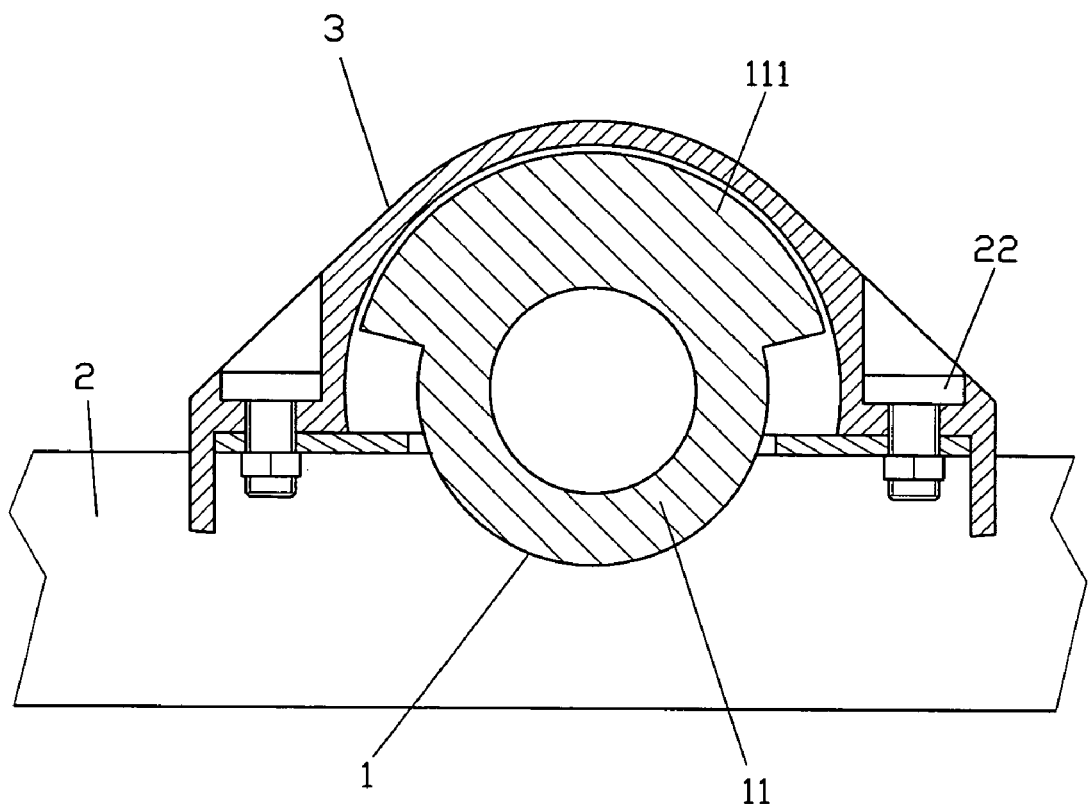
FIG. 3 is a cross-sectional view taken along line A-A of FIG. 2.

As shown in FIG. 3, the round plates 11 of the center tube 1 are located in the slots 213 of the receiving base 21 with the lugs 111 of the round plates 11 inserting into the ditches 31 of the restrictor 3, allowing the round plates 11 to slide along the ditches 11 at a predetermined angle. The bolts 22 are inserted through the through holes 32 and 212 and secured with the nuts 221 at the end.

Figure 4:
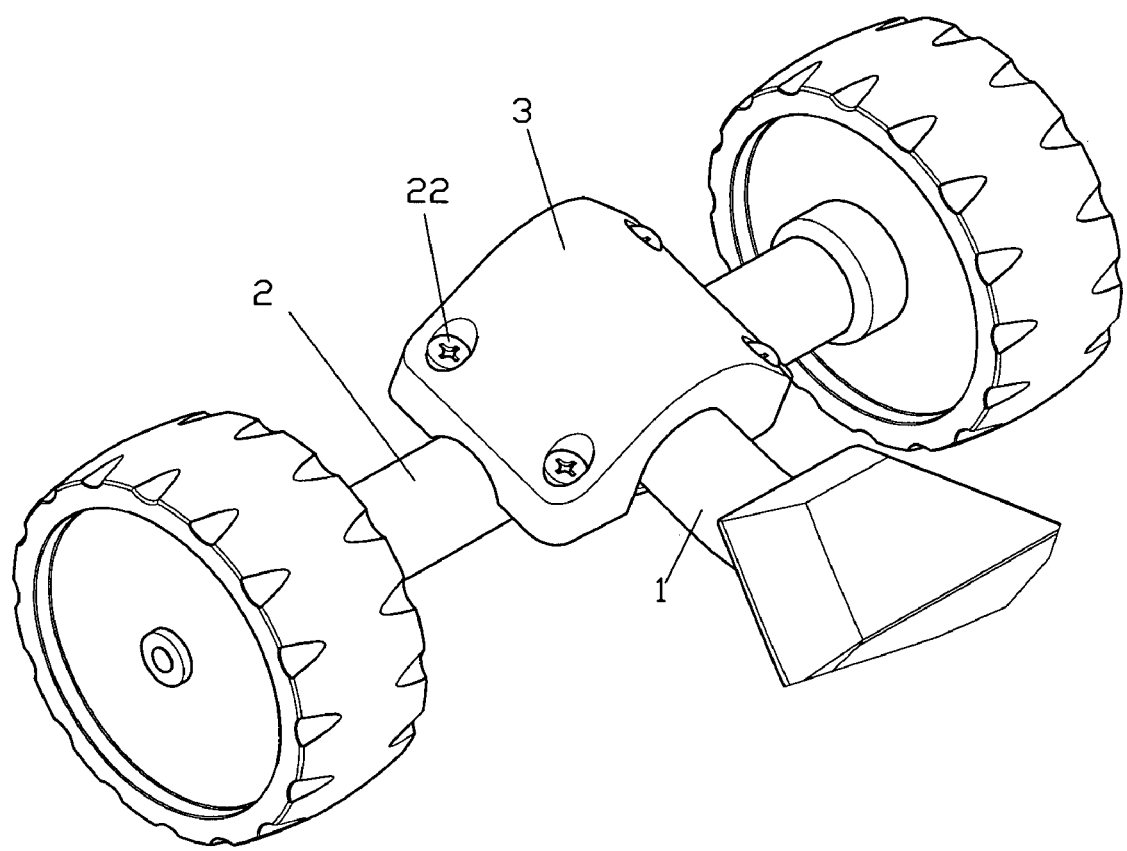
FIG. 4 is a perspective view of the present invention applied to a front wheel set of a scooter.

When the present invention is applied to the turning mechanism of a scooter, as shown in FIG. 4, the center tube 1 may be turned freely at a predetermined angle in order to maintain a balance to a user.

Figure 5:
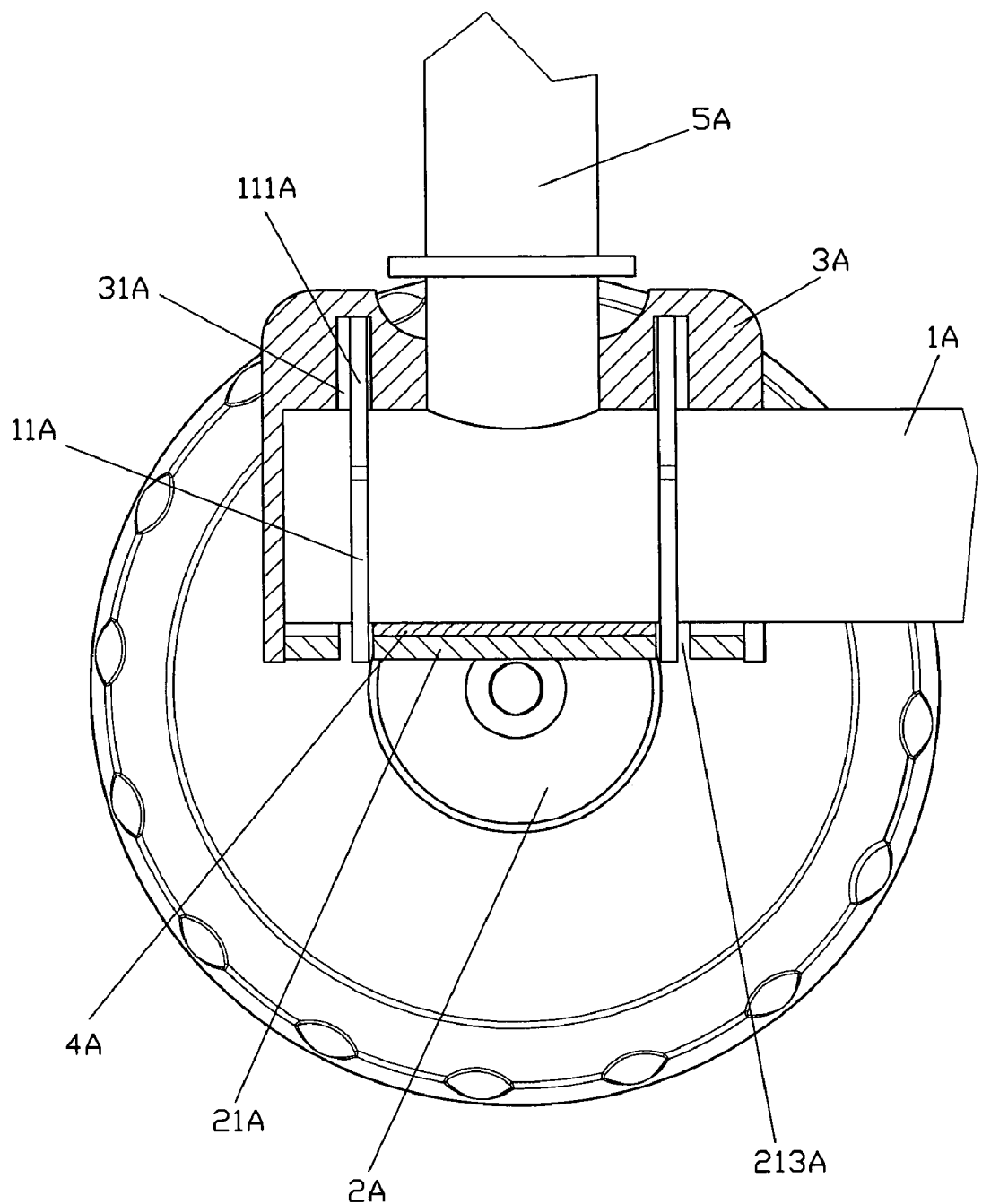
FIG. 5 is a side sectional view of a second embodiment of the present invention.
Figure 6:
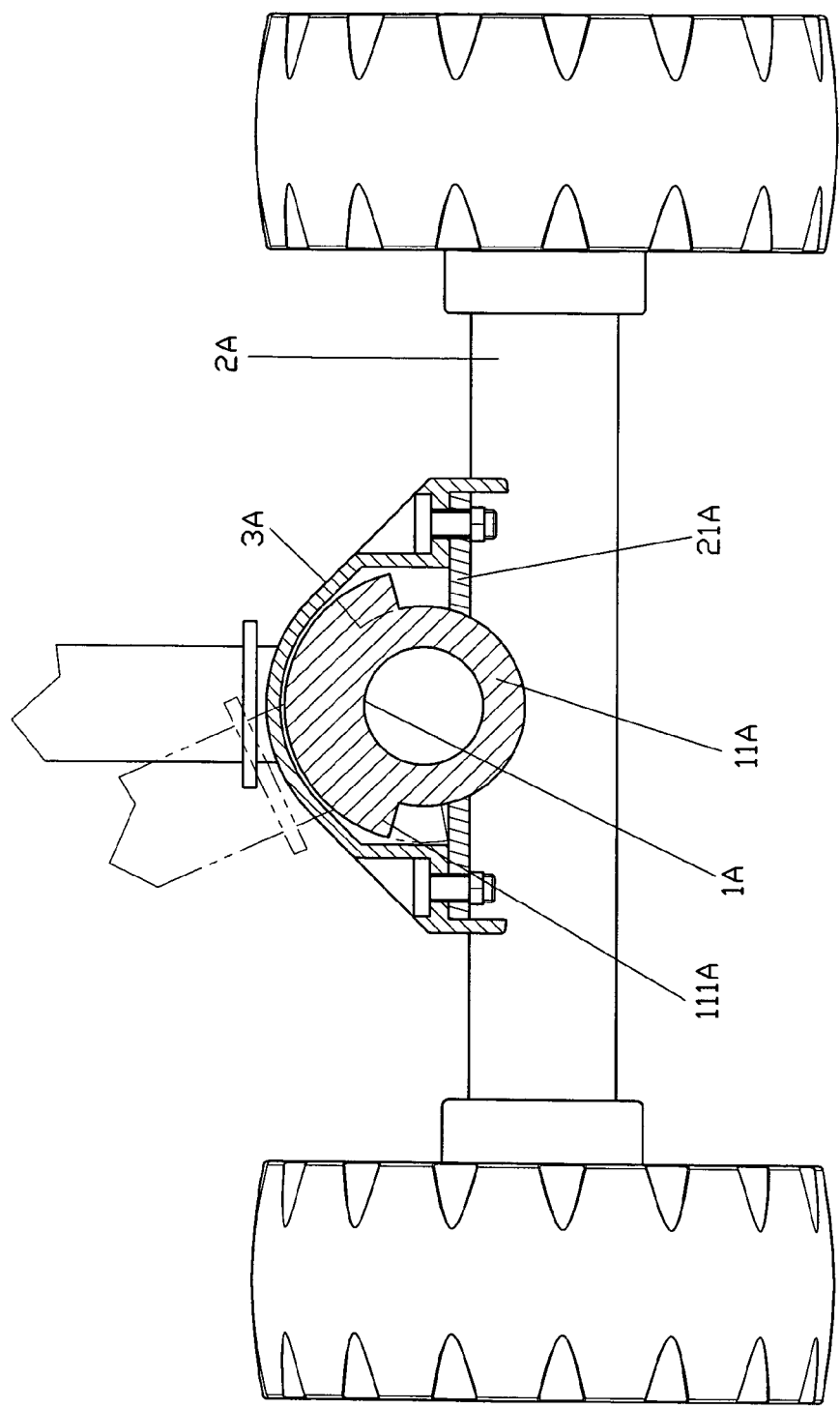
FIG. 6 is a front view of the second embodiment of the present invention, partially sectioned.

As shown in FIGS. 5 & 6, a second embodiment of the present invention is applied to a front wheel set and comprises a center tube 1A, an axle pipe 2A, a restrictor 3A and an elastic piece 4A. The center tube 1A is connected to a handle 5A. The center tube 1A comprises two spaced round plates 11A at a front section. Each round plate 11A has a lug 111A. A curved receiving base 21A is provided on the axle pipe 2A. The receiving base 21A has a pair of slots 213A corresponding in position to the round plates 11A. The round plates 11A of the center tube 1A are located in the slots 213A of the receiving base 21A, and the lugs 111A of the round plates 11A are inserted into ditches 31A of the restrictor 3A in a slidable manner at a predetermined angle.

Figure 7:
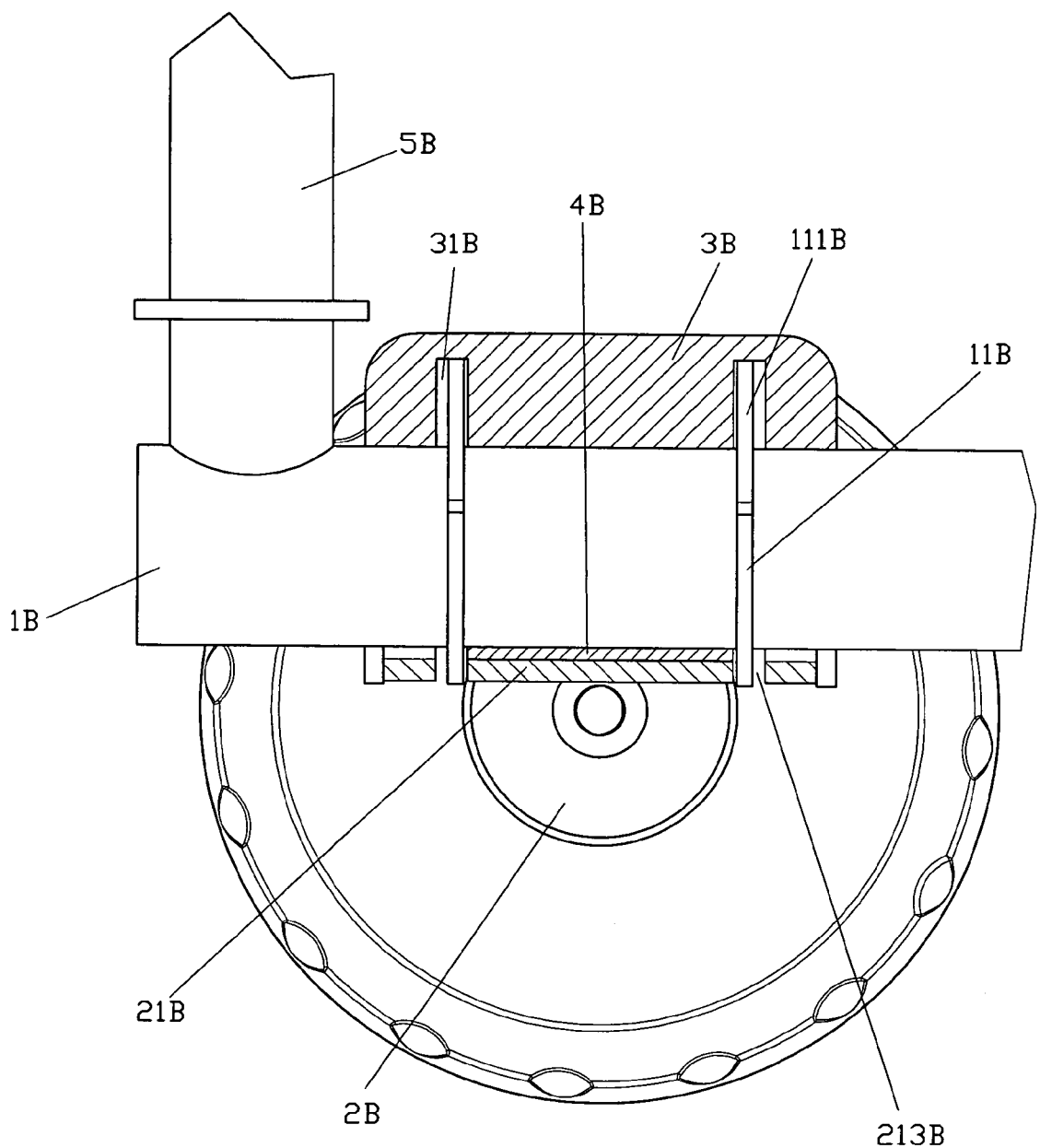
FIG. 7 is a side sectional view of a third embodiment of the present invention.
Figure 8:
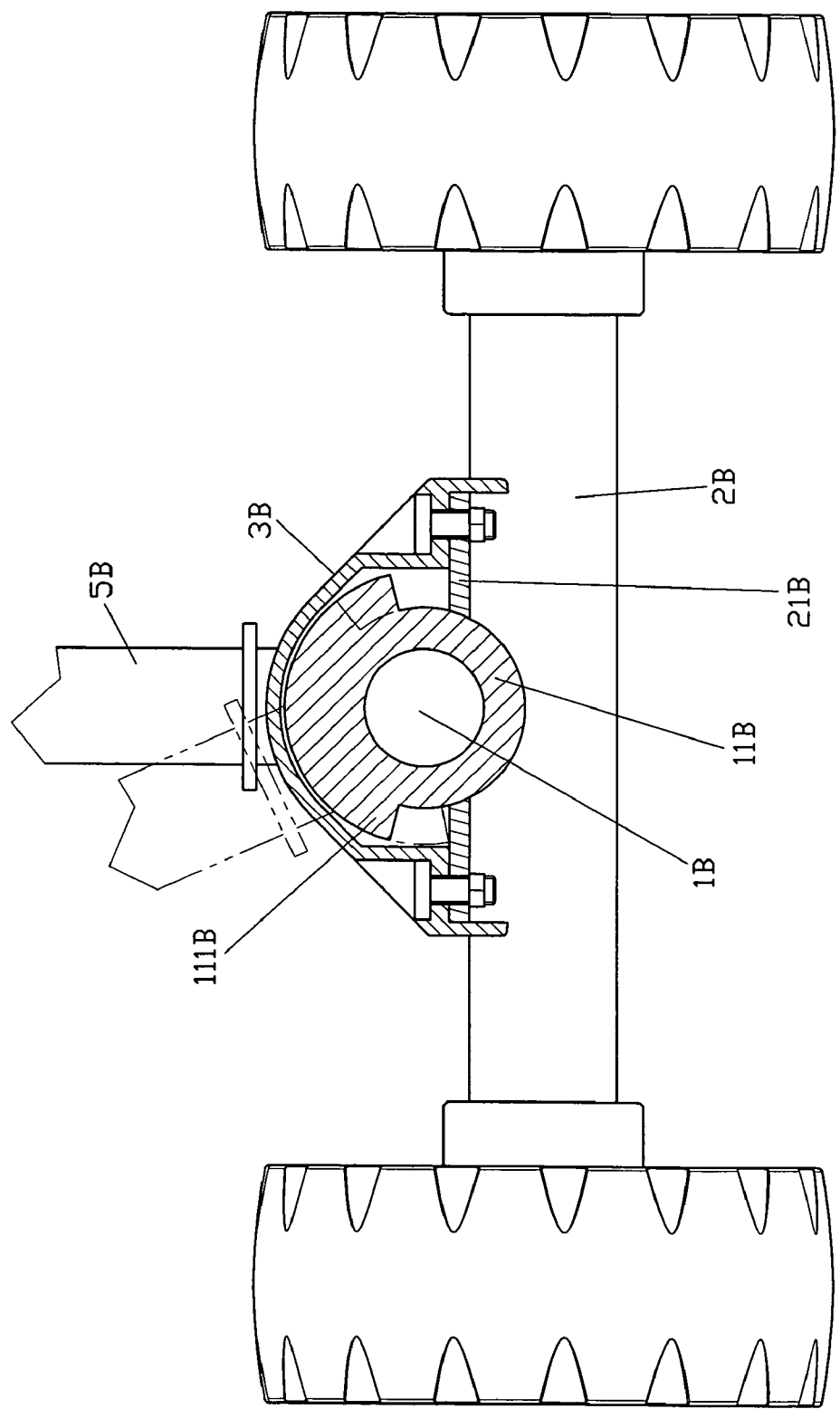
FIG. 8 is a front view of the third embodiment of the present invention, partially sectioned.
Figure 9:
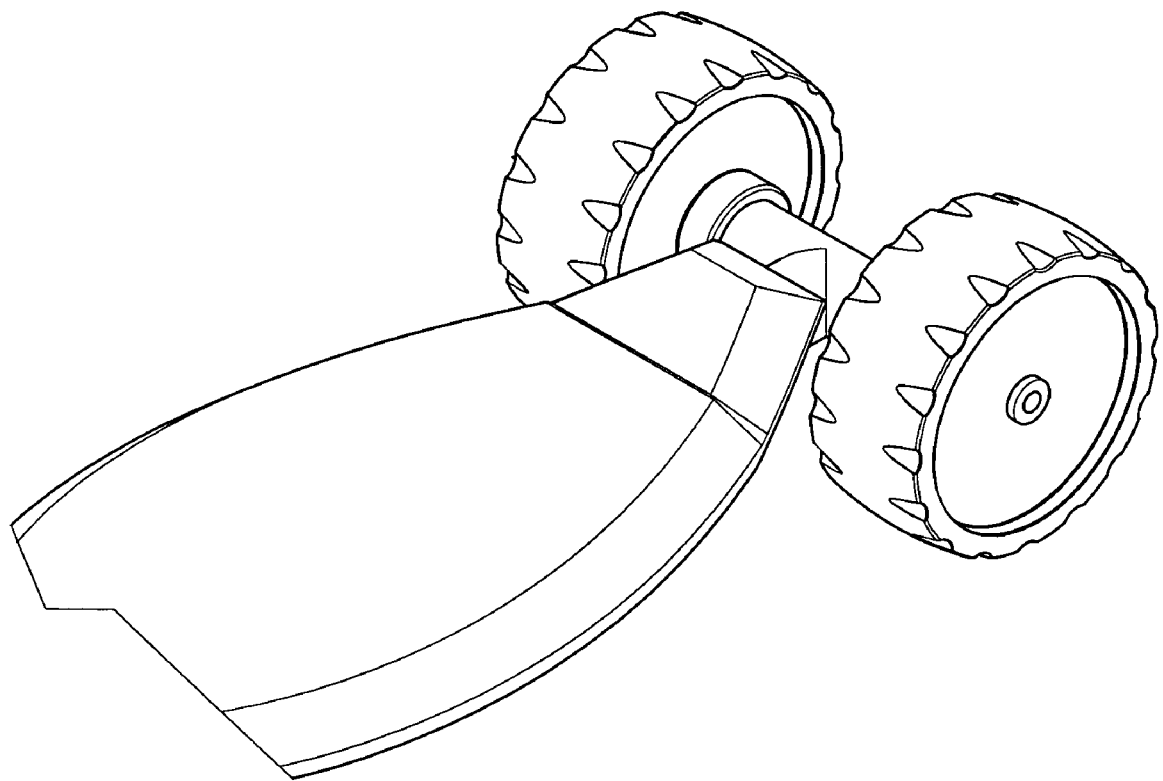
FIG. 9 is a perspective view of a prior art.

A third embodiment of the present invention, as shown in FIGS. 7 and 8, is also applied to a front wheel set, and comprises a center tube 1B, an axle pipe 2B, a restrictor 3B and an elastic piece 4B. The center tube 1B is connected to a handle 5B. The center tube 1B comprises a pair of spaced round plates 11B at a front section. Each round plate 11B has a lug 111B. A curved receiving base 21B is provided on the axle pipe 2B. The receiving base 21B comprise a pair of slots 213B corresponding in position to the round plates 11B. The round plates 11B of the center tube 1B are located in the slots 213B of the receiving base 21B. The lugs 111B of the round plates 11B are inserted into ditches 31B of the restrictor 3B in a slidable manner at a predetermined angle.

I claim:

1. A swinging device for a wheel set comprising a center tube, an axle pipe, a receiving base and an elastic piece;

said center tube comprising a pair of round plates at a rear section, said round plates having lugs;

said axle pipe comprising a receiving base, said receiving base comprising a pair of slots corresponding in position to said round plates of said center tube and a pair of fins at respective sides, said fins comprising through holes thereon for insertion of bolts;

a restrictor being pivotally connected to the rear section of said center tube and comprising ditches corresponding to said round plates of said center tube for insertion of said lugs of said round plates, said restrictor comprising through holes corresponding in position to said through holes of said receiving base and said bolts for securing purpose;

said elastic piece being placed between the rear section of said center tube and said receiving base of said axle pipe.

2. The swinging device for a wheel set, as recited in claim 1, wherein said receiving base of said axle pipe is a curved shape.

* * * * *